United States Patent [19]

Steiner et al.

[11] Patent Number: 5,435,430
[45] Date of Patent: Jul. 25, 1995

[54] BUCKET CONVEYING METHOD AND APPARATUS

[75] Inventors: Joseph Steiner, Somerset; Michael A. Carter, Flanders; Robert E. Strom, Kinnelon, all of N.J.

[73] Assignee: Nabisco, Inc., Parsippany, N.J.

[21] Appl. No.: 297,562

[22] Filed: Aug. 31, 1994

Related U.S. Application Data

[63] Continuation of Ser. No. 50,685, Apr. 22, 1993, abandoned, which is a continuation of Ser. No. 296,834, Jan. 13, 1989, abandoned.

[51] Int. Cl.⁶ .............................................. B65G 37/00
[52] U.S. Cl. .............................. 198/370.05; 198/703; 198/706
[58] Field of Search ............... 198/703, 706, 477.1, 198/365, 366, 370, 356, 358, 500, 771, 713, 714

[56] References Cited

U.S. PATENT DOCUMENTS

| | | |
|---|---|---|
| 626,956 | 6/1989 | Wrightson . |
| 690,518 | 1/1902 | Frith . |
| 720,963 | 2/1903 | Petersen . |
| 2,189,243 | 2/1938 | Evans . |
| 2,402,986 | 7/1946 | Cunning . |
| 2,704,177 | 3/1955 | Neaves . |
| 3,006,452 | 10/1961 | Hill . |
| 3,055,486 | 4/1962 | Meyer . |
| 3,295,656 | 1/1967 | Benier . |
| 3,357,539 | 12/1967 | Naslund . |
| 3,550,752 | 12/1970 | Gregor . |
| 3,919,969 | 11/1975 | Leverett . |
| 4,204,325 | 12/1981 | May et al. . |
| 4,211,054 | 7/1980 | Sramek . |
| 4,366,628 | 1/1983 | George . |
| 4,419,953 | 12/1983 | Fowler . |
| 4,431,678 | 2/1984 | Sollich . |
| 4,477,483 | 10/1984 | Lewis . |
| 4,560,139 | 12/1985 | Dahlke . |
| 4,607,745 | 8/1986 | Wiese . |
| 4,614,162 | 9/1986 | Ryan et al. . |
| 4,658,708 | 4/1987 | Rastoin . |
| 4,892,179 | 1/1990 | Lassiter et al. . |
| 4,910,031 | 3/1990 | Budd et al. . |
| 4,960,199 | 10/1990 | Lassiter, Jr. et al. ............... 198/494 |
| 4,972,934 | 11/1990 | Lassiter, Jr. et al. ............... 198/370 |
| 5,038,910 | 8/1991 | Lassiter, Jr. et al. ............ 198/349.6 |
| 5,160,016 | 11/1992 | Moksnes ............................. 198/533 |
| 5,316,195 | 5/1994 | Moksnes et al. ................ 222/146.6 |

FOREIGN PATENT DOCUMENTS

| | | |
|---|---|---|
| 2480082 | 10/1981 | France . |
| 19221 | 2/1982 | Japan . |
| 177806 | 10/1983 | Japan . |
| 2118016 | 9/1987 | United Kingdom . |
| 1217749 | 3/1986 | U.S.S.R. . |

*Primary Examiner*—Cheryl L. Gastineau

[57] ABSTRACT

There is utilized a particular bucket conveyor apparatus for the transport of fragile articles such as cookies and crackers from an input feed point to a multiple number of discharge areas. At the discharge areas the bucket conveyors are tilted rearwardly to spread the fragile crackers and cookies over a lower transverse belt or vibrating conveyor. In the operation of the apparatus each of the buckets is filled initially to less than about 50 percent of its volume. In this way if there is not an available discharge point, the bucket can once again go through the cycle before it would reach a point of overflowing. When the buckets are in a full condition, they will empty half or more of their contents onto a storage station conveyor prior to passing the input feed point. This bucket conveyor mechanism lends itself to a high degree of computerized control.

1 Claim, 4 Drawing Sheets

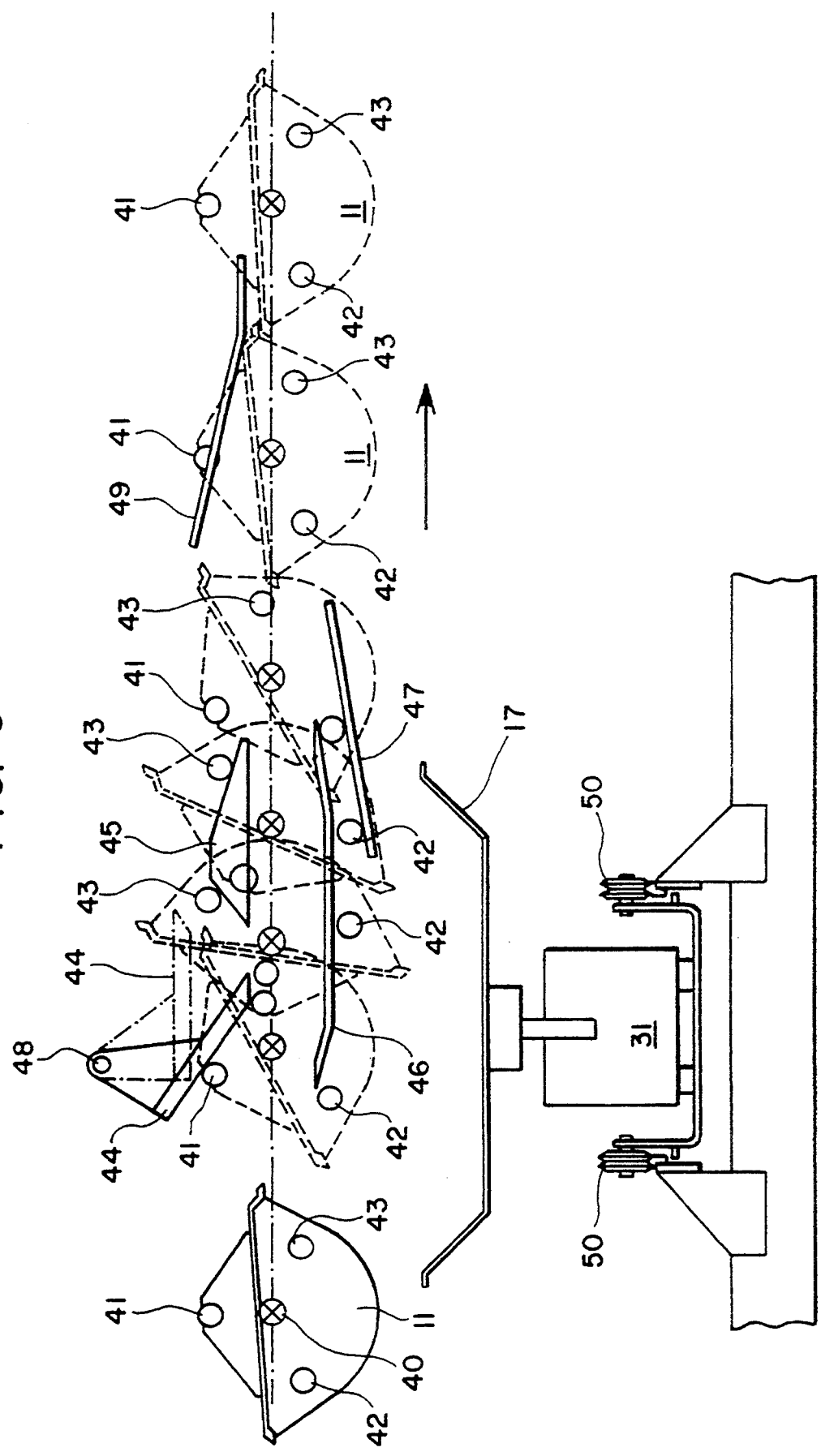

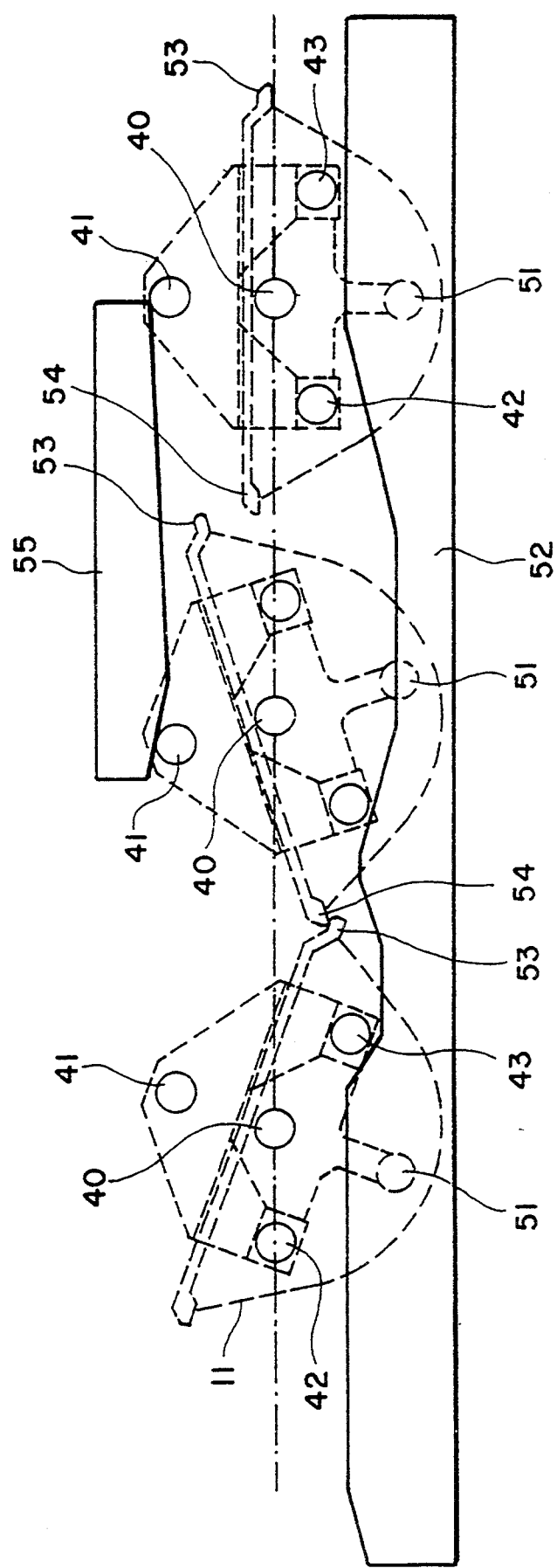

BUCKET CONVEYING METHOD AND APPARATUS

This application is a continuation of prior U.S. application Ser. No. 08/050,685, filed Apr. 22, 1993 which is a continuation of application, abandoned, and Ser. No. 07/296,834 filed Jan. 13, 1989, abandoned.

The present invention relates to a method and apparatus for conveying fragile articles from one point to another point. More particularly, this invention relates to a bucket conveyor system which can be utilized for conveying fragile bakery products from one point in the baking and/or packaging process to another point in the baking and/or packaging process.

BACKGROUND OF THE INVENTION

There are various techniques for moving articles from one point in a manufacturing process to another point in a manufacturing process. One common technique is to use belt conveyors. The belt conveyors can be a simple strip of belting which is continuously moved over rollers or can be varied to contain channels in which various goods can be guided from one point to another point. Another technique for moving articles from one point to another point is the use of bucket conveyors. Bucket conveyors are particularly useful when articles are to be moved up a steep grade or in an essentially vertical direction. There are yet other uses for bucket conveyors. One of these uses would be in the transport of liquids, such as various viscous liquids. In general, the method of conveying an article or substance from one point to another point will depend to a large degree on the article or substance to be moved and the distance and direction in which it is to be moved.

In the present application for patent the objective is to move fairly fragile articles from one point in the manufacturing process to another point in the manufacturing process, and in particular to the packaging part of the process. The fragile articles that are to be moved are various bakery products, and in particular, cookies, crackers and related products. Any rough handling of cookies and crackers subsequent to baking will result in many of these cookies and crackers becoming broken, chipped and otherwise undergoing degradation. Broken crackers and cookies cannot be packaged since the consumer is expecting to purchase a package of cookies or crackers that are in one piece and which can be utilized in that condition. Some cookies and crackers will break during transport. However, with effective packaging and reasonable handling, any such breakage will be held to a minimum. The problem of an excessive amount of broken cookies or crackers in a package would be increased if a large number were broken during the manufacturing process and packaged along with the whole cookies or crackers.

In the present instance, it has been found that a bucket conveyor system can be utilized to effectively transport fragile articles in a manufacturing system. The bucket conveyor system will hold the articles in a static condition while the bucket moves the articles from a receiving point to a discharging point. That is, the fragile articles, such as cookies and crackers, are not continuously being handled and jarred as they would for instance on a conventional belt or vibrating conveyor. Further the buckets are filled to less than half of their volume so that in processing there will be less handling. That is the buckets can traverse the bucket conveyor system twice before the buckets could reach an overfill situation. However the system is designed so that an overfill situation will not occur.

Various types of bucket conveyors have been used to transport a wide variety of articles. For instance, U.S. Pat. No. 626,956 discloses an apparatus for discharging coal into the holds of ships. The apparatus consists of a number of bucket type conveyors B which at an uppermost point receive a charge of coal and move this coal downwardly to an area $C_1$ where it is discharged from the conveyor via one end of the conveyor. This patent shows the use of an end discharge technique from a bucket conveyor. After discharge the bucket collapses and is moved upwardly via an endless belt in another cycle to pick up another charge of coal. This patent, although it does utilize bucket conveyors, it does not utilize the rearward laying down of the bucket contents nor the distribution of the contents of a bucket conveyor across another surface such as a belt or vibrating conveyor.

U.S. Pat. No. 2,704,177 discloses a roll panning machine. The roll panning machine is utilized to deposit dough rolls into baking pans. The dough rolls are received by buckets (5) of the endless conveyor from a rotating wheel mechanism. The dough rolls are then transported in the buckets until they reach designated chutes (55) where the buckets are rearwardly unloaded depositing the dough rolls down into the chutes and into a baking pan at the bottom of the chutes. The baking pans consist of a conveyor which moves transverse to the direction of the bucket conveyor. Although this patent does show the rearward emptying of a bucket, there is no mechanism disclosed with regard to partially filling the buckets so that they can go through more than one cycle prior to reaching a point of bucket overflow.

U.S. Pat. No. 3,295,656 discloses a conveyor method and apparatus for handling balls of dough. This method and apparatus consists of a series of bucket conveyors wherein at one point in the system the buckets each receive a dough ball and move this dough ball to a discharge chute (4). When the bucket approaches the discharge chute the bucket is fully inverted and drops the dough ball downwardly into the chute. The bucket is then returned to the dough ball receiving position to receive another dough ball. This patent shows the transport of bakery dough but it does not disclose the rearward spilling of the contents of a bucket nor the method of partially filling the conveyor buckets so that they can traverse through more than one cycle prior to a bucket potentially reaching an overflow situation.

U.S. Pat. No. 4,304,325 discloses a conveyor system for conveying articles, such as food items, in bucket conveyors. The bucket conveyors will deposit the food items into particular lanes of a transverse moving conveyor. This patent also shows the bucket conveyors depositing the food item onto the transverse moving conveyor belt by means of a rearward spilling of the item onto a sector of the belt. The moving belt is shown in FIGS. 4 and 5. However, this patent does not show the rearward spilling and spreading of a fragile food product across a lower surface nor does it show a system of partially filling the buckets of a bucket conveyor such that a bucket may undergo more than one cycle prior to reaching a point of overflow.

U.S. Pat. No. 4,366,628 discloses an invertible pan conveyor apparatus and method for the conveying of food items such as grains, cereals, tea or coffee. In this apparatus the food item is received from a chute onto the pans of the pan conveyor. The food item is conveyed through an apparatus such as a dryer first in one direction designated (86) whereupon each pan deposits its contents downwardly through a chute and onto a lower pan which travels in the opposite direction (106). The food item then travels to the region of chute (60) where the food item is removed from the pan by means of the pan back tilting and depositing the food item downwardly through a chute. This patent is interesting with regard to showing the rearward spilling of food items from a back tilting pan. However, there is no disclosure, among other things, of the use of a system where each pan is filled only to part of its capacity so that it can pass through more than one cycle before being filled to an overflow condition.

Russian Patent 1,217,749 discloses a method for conveying bread forms. In this apparatus a pan containing baked bread is conveyed to a discharge point where the pan is essentially inverted using a rearwardly tilting motion in order to remove the loaf of baked bread from the pan. The pan is then returned to the upright condition in preparation for the next cycle.

Japanese Patent Application No. 55-93489 discloses a classifying bucket system for use with fruits and vegetables. In this system a series of buckets carry the fruits and vegetables. These buckets are supported on each side by continuous conveyor chains. The bucket itself upon reaching the point where the product is to be discharged discharges the product through tilting sideways to empty the fruits or vegetables from the bucket. This patent is interesting but it does not utilize a rearward spilling technique nor does it show the concept of partially filling the buckets so that they may go through more than one cycle prior to reaching a point of overflow.

French Patent 2,480,082 discloses a method and apparatus for the depositing of dough pieces onto a conveyor. The dough pieces are held in a proofer conveyor pocket which at the proper point will tilt and drop the dough ball into the flexible pocket (4). This flexible pocket (4) will then tilt rearwardly and deposit the dough ball downwardly onto the conveyor belt (5). The flexible pocket (4) is then in a position to receive another piece of proofed dough. This flexible pocket is stationary. Consequently this patent shows the deposit of a dough piece downwardly from a stationary flexible pocket and depositing this dough piece onto a conveyor which is moving in a direction opposite to that of the conveyor that transported the dough piece to the flexible pocket. This patent does show a type of rearward spilling of a food item from a bucket but it does not show the rearward spilling of a fragile food item across a lower surface nor the utilization of a system wherein the buckets of a bucket conveyor are partially filled so that they may transverse through more than one cycle of the operation prior to reaching an overflow situation.

Japanese Patent 58-177806 discloses an apparatus for conveying cereals. This patent discloses an apparatus whereby bucket conveyors are utilized to transport a cereal to a tank (3). In this apparatus the particular buckets are tilted forwardly, and when so tilted, deposit the cereal downwardly into the tank (3). This patent differs from the present bucket conveying technique since it is directed to forward tilting buckets for emptying and further does not disclose a partial filling of the buckets so that the buckets can go through more than one cycle prior to reaching an overflow situation.

United Kingdom Patent Application 2,180,016 discloses a method and apparatus for transporting fragile items such as fruits. In this patent there is shown the conveying of the fruit in individual buckets to a receptacle which has a rotary brush (14) and a stationary brush (16). This brush mechanism deposits the fragile fruit items onto transporter conveyor (18). This patent does show the rearward spilling of an item from a bucket conveyor. However, there is not shown the technique of partially filling the buckets so that the buckets can travel through more than one cycle prior to reaching an overflow condition.

These patents are of interest with regard to illustrating that bucket conveyors have been utilized in various art areas. However, there is no disclosure in these patents with regard to a bucket conveyor method and apparatus for effectively handling fragile articles such as cookies and crackers.

BRIEF DESCRIPTION OF THE INVENTION

The present invention is directed to a method and apparatus for conveying fragile articles from point A to point B. This consists of a bucket conveyor system. The buckets of the bucket conveyor continuously move along a set track receiving the fragile articles at one or more input points and discharging the articles at one or more discharge points. In the filling of the buckets of the bucket conveyor the buckets are preferably filled to approximately 30 to 45 percent of their volume when they pass by a feed belt or vibratory conveyor or the like, which deposits the fragile articles into each bucket. Most preferably, the buckets are filled to about 40 percent of their volume. The buckets then travel to one or more discharge points where they are rearwardly tilted to lay and spread their contents over a discharge conveyor or table. The bucket then continues along a path back to the feed conveyor where it again is partially filled with fragile articles. In the event that the conveyor bucket is not emptied at a discharge point, it will receive a second batch of fragile articles. This second batch will be approximately 30 to 45 percent of the bucket volume and most preferably about 40 percent of the bucket volume. This is the case since the first filling was to less than about 50 percent of the bucket volume and a further product fill will not create an overflow condition.

There are two means of preventing the buckets from becoming overfilled with product. In a first technique each bucket in a cycle through the system passes a storage station which is off-line. By off-line is meant that the storage station will store product and put it back into the system at a later time. Each bucket is tilted rearwardly at the storage station so as to discharge any of its contents which exceed about 50 percent, and preferably about 55 percent of its volume, onto a storage station conveyor. If the bucket contains less than about 50 percent of its volume of product, little or no product will be rearwardly layed down onto the storage station conveyor. However, if the bucket contains more than about 50 percent by volume of product, the excess product will be layed down onto the storage station conveyor when the bucket is tilted. In general, product will be removed from a bucket only when it has received two loadings of product at the feed point with no discharge onto a discharge conveyor. In this way, the bucket will not be more than half full and will usually be about 30 to 45 percent full prior to again passing by the feed conveyor. This will prevent the overfilling of a bucket with product. All of the product remaining in a bucket could be removed to the storage station prior to passing the feed conveyor, but this would result in needless extra handling of the product increasing the possibility of product degradation.

In the second technique, the buckets can be partially emptied only when it is determined that they are more than half full of product, and about 60 to 90 percent by volume full of product. In such an instance, a sensor will determine the status of each bucket prior to that bucket reaching the storage station conveyor. If it is more than about half full, it will tilt the bucket to remove product so that the bucket will contain less than about 50 percent by volume of product. All of the product could be removed but this would entail needless extra handling of the product. In this way when the bucket passes by the feed conveyor, it can accept product without reaching an overfill condition. Although either of these techniques can be used, the prior technique where each bucket is tilted rearwardly during each cycle is preferred.

The apparatus is designed so that the buckets overlap or engage one another to prevent product from falling between buckets during filling. However, the overlapping must be reversed twice during a full circuit of the conveyor system. The first to permit the rearward tilting to discharge product. The second to return to the overlap position prior to being fed more product.

In a preferred mode, the product that is being transported consists of cookies, crackers and related snack products. These products need careful handling to prevent breakage, edge chipping and general product degradation from item-item contact. Through the use of this bucket conveyor apparatus and method, upstream processing of the product can be continued while a downstream problem is being resolved. The product, such as cookies and crackers, that is in excess of about 50 percent of the volume of a bucket, will be stored at the storage station during the occurrence of a problem and returned to mainstream processing when the downstream problem is corrected. The off-line storage and the double filled buckets upstream of the storage station are a useful buffer that is built into the system to prevent the overfilling of buckets and to minimize handling. This is particularly important when the upstream processing includes proofing and baking. In baking it is desireable to maintain a continuous oven flow so as to maintain steady state oven conditions and thus produce uniformly baked cookies, crackers and other products.

BRIEF DESCRIPTION OF THE DRAWINGS

FIG. 5 is a side elevational view of the discharge of items from the buckets.

FIG. 6 is a side elevational view of the assembly to reverse the contact of one bucket with another.

DETAILED DESCRIPTION OF THE INVENTION

Figure 1:
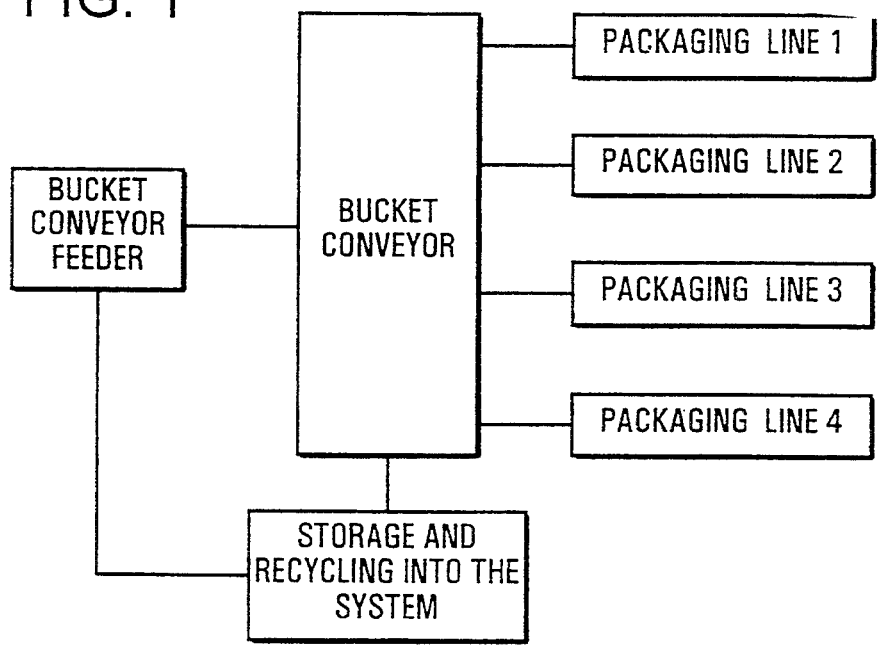
FIG. 1 is a schematic diagram of the present process for conveying fragile articles using a bucket conveyor.

The present bucket conveying apparatus has been devised for the transport of fragile articles from one point to another point. Although these fragile articles can consist of essentially any article that is easily broken or which is easily degraded, it is specifically directed to the transporting of fragile bakery product items from one point to another point. In particular, this bucket conveyor apparatus is specifically directed to the transport of cookies and crackers after baking from one part of the processing to another part of the processing, such as packaging. It is essential during this transporting that the cookies and crackers be handled as gently as possible. The reason for this is quite obvious. The consumer when he purchases a box of cookies or crackers, wants essentially all of the cookies and crackers to be in a whole condition. He does not want a high number of cookie or cracker fragments. This is particularly the case with crackers which are to be utilized along with other foods such as cheeses, dips and the like.

The presently devised bucket conveyor system transports fragile items such as cookies and crackers with a minimum of handling and provides a technique whereby the degradation and chipping of the cookies and crackers is held to a minimum. Some of the key features of this bucket conveyor apparatus consist of utilizing buckets so that when the items are to be discharged from the buckets, the buckets are tilted rearwardly so as to spread and to lay the cookies and crackers across a conveyor or table which is located just below the discharge mechanism. By emptying the buckets rearwardly, the cookies and crackers are laid down on the conveyor or table in a gentle manner, and further are spread out to facilitate further processing. In addition, the apparatus is operated so that as each bucket is filled it is filled to less than about 50 percent, and usually to only about 30 to 45 percent of its volume, and preferably about 40 percent of its volume. The reason for this is that if there is a downstream problem and a bucket is not emptied it can go through another cycle of receiving product without reaching a point of the bucket being overfilled. This buffers the system. A problem that could be confronted is that one or more downstream packaging stations are not operating for some reason and product has to be stored at an upstream location. There is also the situation that when the various discharge conveyors or tables are full of product at the time that the buckets pass by, it is preferred that the buckets not be emptied to further load the conveyors or tables, but rather be taken through another cycle until the discharge areas have become available to accept more cookies or crackers.

There are two techniques that are used to accomplish this objective. In the first and preferred technique, each bucket receives product from the feed conveyor. The bucket then traverses the bucket conveyor apparatus and will be rearwardly tilted and lay and spread its contents onto a discharge conveyor that requires product. If no discharge conveyor needs product, then the bucket will go through another cycle. However, prior to passing the feed conveyor the bucket will pass the storage station conveyor. At this point the bucket will be tilted, but only to a degree where product that is in excess of about 50 percent of the volume of the bucket, preferably 45 percent of the volume, and most preferably about 40 percent of the volume, will be rearwardly spread down onto the storage station conveyor. If the bucket only contains one loading of product, then none of the product will be discharged. However, if the bucket contains two loadings of product, that is, it has been filled to about 60 to 90 percent of its volume, then that in excess of about 50 percent of the volume of the bucket, usually more than about 45 percent of the volume, and preferably more than 40 percent of the volume, of the bucket will be removed when the bucket passes the storage station conveyors. In this mode of operation the buckets are tilted at the storage station conveyors during each cycle of the buckets through the system.

In the alternative, the buckets can be tilted at the storage station conveyors only when a bucket contains two loadings of product from the feed conveyor. This is when the bucket is filled to more than about 50 percent of its volume. A monitoring control device such as an ultrasonic or a photoelectric sensing mechanism, or a computer controlled tracking system, can be used to determine the product content of each bucket. A computer controlled tracking system has in its memory the fill status of each bucket. The bucket will then be tilted rearwardly to discharge about half or more of its contents onto the storage station conveyor. It will then pass by the feed conveyor and receive a second loading of product and go through another cycle. The difference from this technique and the prior technique of preventing bucket overfill is that in the former technique, each bucket is rearwardly tilted at the storage station conveyor while in the latter technique, only buckets that are filled to more than about 50 percent of their volumes are rearwardly tilted. Otherwise the bucket conveyor systems are the same.

FIG. 1 sets out in a schematic diagram the present process. It is seen here that a bucket conveyor receives cookies or crackers to be packaged from a bucket conveyor feeder. This bucket conveyor feeder feeds cookies or crackers to each bucket of the bucket conveyor system, and is adjusted to preferably fill each bucket to about 30 to 45 percent of its volume, and most preferably about 40 percent of its volume. In this way the bucket can pass by the bucket conveyor feeder a second time without overflowing if its contents have not been emptied onto a transverse discharge conveyor. These discharge conveyors are shown to be in a transverse orientation, however, they can be in other orientations. The bucket conveyor in most instances will deposit the product such as cookies or crackers onto one of the transverse discharge conveyors in each pass. However, if there is no transverse discharge conveyor that requires more product such as cookies or crackers, the bucket will, pass to the storage station conveyor. At the storage station conveyor either of two operations will be carried out. Either each bucket will be tilted rearwardly so as to lay and spread any cookies and crackers above about 50 percent of its volume onto the storage station conveyor, or a monitoring control device will determine if a bucket is more than about 50 percent filled and will only tilt those buckets rearwardly to lay and spread any cookies and crackers above about 50 percent of its volume onto the storage station conveyor. The cookies and crackers that are deposited onto the storage station conveyor will be stored for a short time and returned to the system. In this way with regard to cookies and crackers, the front end operations, for instance the proofing and baking operations, can be continued until the downstream problems have been resolved. This provides for a very versatile system, and one that can easily be computerized. A specific use for this bucket conveyor system is in delivering cookies, crackers and similar products to a plurality of packaging lines.

Figure 2:
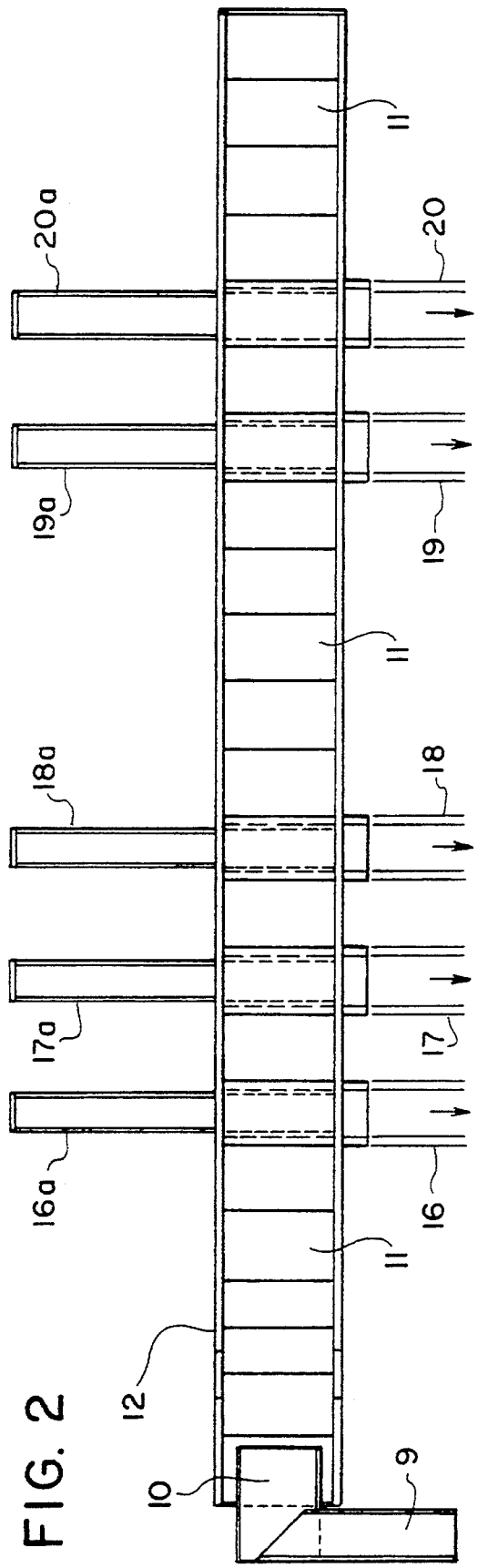
FIG. 2 is a top plan view of the bucket conveying apparatus.
Figure 3:
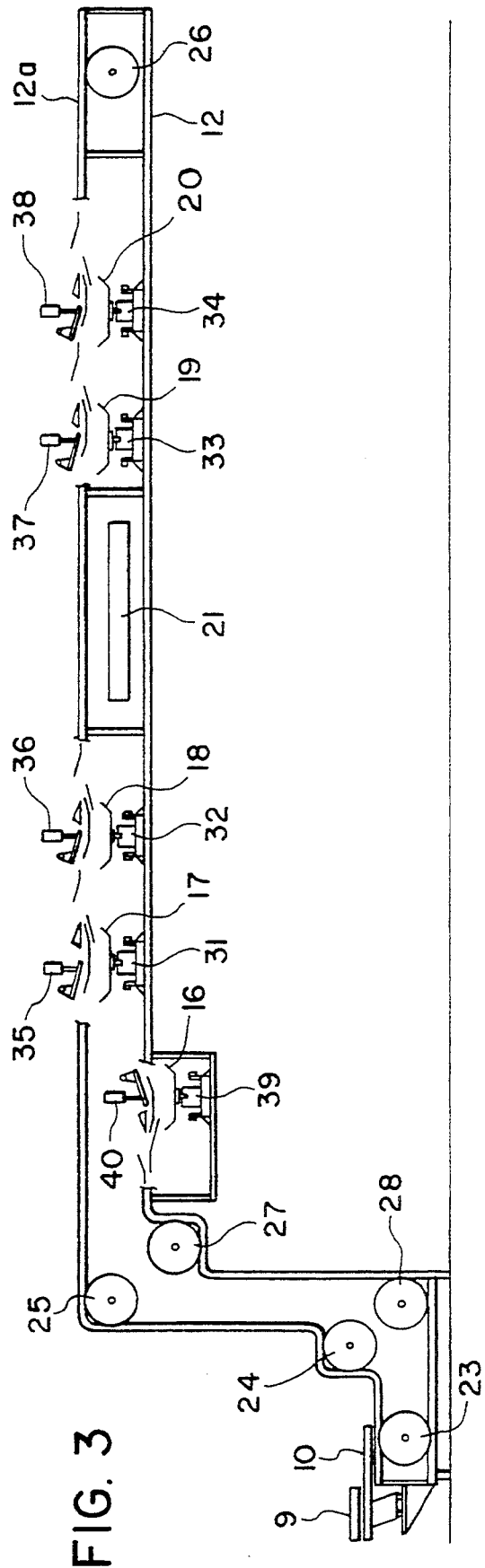
FIG. 3 is a side elevational view of the bucket conveying apparatus of FIG. 1.

The present bucket conveyor will now be described in detail with reference to the drawings and in particular with respect to cookies or crackers. FIG. 2 is a top plan view of the bucket conveyor assembly. As shown, a belt conveyor 8 delivers the cookies and crackers to vibratory conveyors 9 and 10 which feed and uniformly distribute the cookies or crackers into the conveyor buckets 11. Vibratory conveyors 9 and 10 are shown as being at a right angle to each other. However, these conveyors can be in-line or at an angle of other than 90 degrees. The cookies or crackers move downwardly towards the buckets of the bucket conveyor at a given rate. No elaborate mechanism utilizing gates and the like needs to be used in order to fill the buckets to an approximate volume with cookies or crackers. The bucket conveyor assembly 12 carries a plurality of buckets 11 which continually move from one end of the apparatus to the other end of the apparatus. As shown in FIG. 3, the buckets will be filled with cookies or crackers at 10 and then will go through a vertical climb and move along bucket conveying area 12a. Although the bucket conveyor is shown incorporating a section that goes through a vertical climb, this is not a necessary feature of the apparatus. The bucket conveyor also can be operated in solely a horizontal mode. Exiting at right angles to the bucket conveyor area 12a are transverse conveyors 17, 18, 19 and 20 which are adapted to receive cookies or crackers from the various buckets. The buckets discharge their contents onto transverse conveyors 17, 18, 19, and 20 by means of a bucket tilt mechanism which is described in more detail in FIGS. 3 and 5. If the buckets do not tilt and empty onto one of these transverse discharge conveyors they will receive a second charge of cookies or crackers at feed conveyor 10. If after receiving a second charge of cookies or crackers in a second pass by the feed conveyor 10 there is still no product discharged onto a transverse discharge conveyor then each bucket upon being tilted rearwardly will lay and spread up to about half of its contents onto storage station conveyor 16 which conveys the cookies or crackers to storage. As has been noted above, in one operating mode, each bucket is tilted rearwardly at the storage station conveyor during each cycle and tilted to an extent so that any cookies or crackers in excess of about 50 percent, preferably about 45 percent and most preferably about 40 percent of the volume of the bucket will be layed and spread onto the storage station conveyor. The remainder of the cookies or crackers will remain in the bucket. The bucket will then receive another charge of cookies or crackers equal to preferably about 30 to 45 percent, and most preferably about 40 percent of its volume. In a second operating mode, the buckets will only be tilted rearwardly to empty about 50 percent of its volume of cookies or crackers only when the bucket is filled to 60 to 90 percent of its volume with cookies or crackers. This condition is sensed by the monitoring control device. Therefore when a bucket is empty, or is filled to less than 50 percent of its volume with cookies or crackers, it will not be tilted. However, when the bucket is filled to more than about 50 percent of its volume with cookies or crackers, it will be tilted rearwardly to lay and spread about half or more of its contents. These cookies and crackers will then be fed back into the system at the proper time.

The rails 17(a), 18(a), 19(a), 20(a) and 16(a) respectively, support transverse conveyors 17, 18, 19 and 20 and storage station conveyor 16. In one mode these are vibratory conveyors which can be moved rearwardly on their companion rails for cleaning and other maintenance.

With specific reference to FIG. 3, there is shown an elevational view of the apparatus of FIG. 2. Here again the feed conveyor is designated as 10. In FIG. 3 it is seen that feed conveyor 10 feeds cookies, crackers or other items to buckets as they pass the discharge end 10a (see FIG. 4) of the feed conveyor. A series of conveyor buckets continuously passes by 10a. Each conveyor bucket then moves through an upper region 12a to deposit its contents onto one of a series of the transverse discharge conveyors 17, 18, 19 or 20. The bucket conveyor assembly 12 carries a plurality of buckets 11 through a circuit that is formed by a number of sprockets. In traveling around the circuit the buckets traverse around sprockets 23, 24, 25, 26, 27 and 28. By controlling the speed of drive sprocket 23, the speed by which the buckets traverse the circuit can also be controlled. In addition the buckets themselves are supported at a balanced midpoint on one or both sides. Each of the transverse discharge conveyors 17, 18, 19 and 20 that is designed to receive cookies or crackers has an associated actuating cam mechanism 35, 36, 37 or 38 respectively to tilt a bucket and to discharge some or all of its contents. This is shown in more detail in FIG. 5. Assemblies 31, 32, 33 and 34 support the transverse discharge conveyors. The storage station bucket tilting mechanism is actuated by actuating cam 40. Assembly 39 supports storage station conveyor 16. This is the conveyor unit that is used when there is a downstream problem and some or all of the cookies or crackers must be stored for later working into the system. At 21 there is shown the bucket monitoring control device for purposes of illustration.

Figure 4:
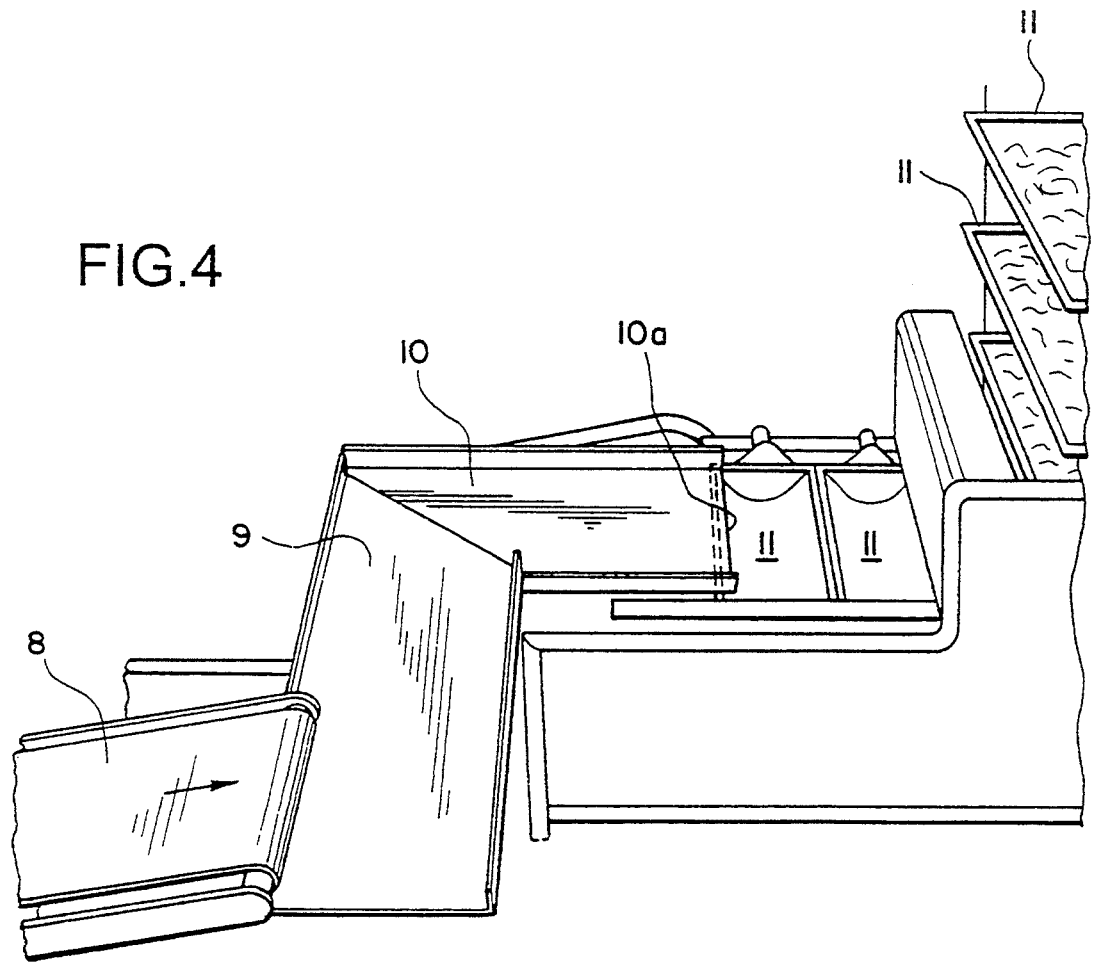
FIG. 4 is a side elevational view of the feeding mechanism to the bucket conveyor.

FIG. 4 shows the bucket loading area in more detail. There is shown here a vibrating conveyor 10 which takes a 90° turn just prior to the point 10(a) of the loading of the buckets. As the cookies, crackers or other items move along the vibratory conveyor 10, they are gently fed into buckets. 11 as the buckets pass under the open end 10a of the vibratory conveyor. As shown, the buckets then move horizontally for a short distance and are then raised vertically to the main part of the conveyor and the discharge region. In this discharge region the bucket conveyors move in essentially a horizontal orientation. The cookies or crackers are delivered to the vibratory conveyor 10 by means of a conveyor 9 or by any other similar technique. As previously noted, the buckets need not go through a vertical climb, but may solely move horizontally along the bucket conveyor apparatus.

FIG. 5 shows one of the mechanisms for discharging the cookies or crackers from a bucket of the bucket conveyor. It is seen here that the buckets 11 are attached to a device, which can be a chain, which moves the buckets by means of mounting pins 40 on one or both sides of the buckets. It is around these pins 40 that the buckets will pivot. As a part of each bucket there are also guide pins. These guide pins are on one or both sides of the buckets and are used to guide the buckets as they are being emptied. The guide pins which are utilized in the emptying of the buckets are guide pins 41, 42 and 43. As is seen in FIG. 5, a part of the discharge mechanism also consists of several guide cams. There are lower stationary guide cams 46 and 47, an upper movable guide cam 44 and an upper stationary guide cam 45. In tilting each bucket, the guide cam 44 contacts guide pin 41 which tilts the bucket rearwardly by moving guide pin 41 downwardly and causes the guide pin 42 of each bucket to ride under guide cam 46. At the point where the bucket is to return to an upright orientation, guide pin 42 passes between guide cam 46 and guide cam 47 which assist in reorienting the bucket. As this is occurring, guide pin 43 is traversing up and over guide cam 45 which assists in holding the bucket in an essentially vertical position so that it can be emptied. As the buckets further move along the system, the front edge of a bucket may contact guide cam 49 which assists in putting the buckets back into a horizontal orientation. Directly under this mechanism for tilting the bucket there is seen conveyor 17 which is maintained in position by conveyor assembly 31. Roller assembly 50 facilitates the removal of conveyor assembly 17 for cleaning and maintenance during operation, if necessary. After the bucket is emptied, it will traverse the apparatus and return to the bucket loading point 10a of the apparatus to once again be filled with cookies or crackers.

In order for a bucket to be tilted cam 44 must be maintained in a downward position, or actuated to move downwardly, so as to cause pin 41 of a bucket to move downwardly. The cam 44 can be actuated electrically, hydraulically or pneumatically. A cam 44 is actuated when a transverse discharge conveyor, such as conveyor 17, needs more product. Cam 44 is pivoted about pin 48 upon actuation. Using this means of emptying the buckets, the buckets tilt rearwardly and gently lay and spread the contained cookie or cracker product across transverse discharge conveyor.

The mechanism that is used in FIG. 5 for rearwardly tilting the buckets for laying and spreading the product across the transverse conveyors is also used for actuating the tilting of the buckets at the storage station conveyor. The only differences are that cam 45 will usually have a different shape and cams 46 and 47 will be located upwardly and closer to cam 45. In this way the bucket will be tilted rearwardly so as to only discharge about half of its contained product when the bucket is in a nearly full condition. By varying the shape and placement of these cams the degree of tilt on the buckets can be set so as to leave any given amount of product in the buckets.

The bucket tilting mechanism at the storage station conveyors will have a cam 44 which is either permanently set at an actuated angle so as to partially tilt each bucket as it passes by the storage station conveyor or actuated by the cam 44 pivoting downwardly and only tilting those buckets that are filled to more than about 50 percent of their volume with cookies and crackers. A monitoring control device will determine the fill status of each bucket.

Another feature of the present bucket conveyor system is shown in FIG. 6. It is shown that when the buckets are in a horizontal arrangement, they form with each other an overlapping surface. This is necessary when the buckets pass under the discharge end 10a of feed conveyor 10. In this way product does not fall down between buckets. It also permits the continuous feeding of product. In fact, it is seen in this figure that end 53 of one of the buckets 11 interfits with end 54 of the adjacent bucket. In this way there is an overlapping surface. In at least two points of the apparatus of FIGS. 2 and 3, the arrangement of ends 53 and 54 must be inverted. This is accomplished through a slight rocking of the buckets so that the ends 53 and 54 can become inverted. This is accomplished by means of cams 52 and 55 and guide pins 41, 42 and 43. Guide pins 42 and 43 interface with guide cam 52 to stabilize the buckets and guide pin 41 of each bucket contacts guide cam 55 to tilt the bucket rearwardly. By means of such contact the buckets 11 are rotated sufficiently around their axis 40 so that the ends 53 and 54 can become inverted but yet product not be released from the buckets. Guide pins 51 stabilize the buckets at other points in the conveyor cycle. In the apparatus of FIG. 2 and FIG. 3 there is an inverting of the ends of the buckets between sprockets 23 and 28 and just after roller 25. This then permits the buckets to be in an intimate contact as they travel throughout the apparatus but yet at the different points when they must be tilted to be emptied or put into a position to be filled, they are edgewise in a proper orientation. That is, when the buckets are being filled, they are in an overlapping relationship so that none of the cookies or crackers fall between the moving buckets. Then prior to the buckets being tilted rearwardly for discharging their contents, the overlapping ends must be reversed. Thus in the system edge inverting mechanisms are needed.

This bucket conveyor apparatus can be used in conjunction with any number of transverse discharge conveyors. In a preferred embodiment each transverse discharge conveyor will feed cookies, crackers or other such articles to a packaging station. Either manually, or through a computer tracking system which receives information from sensors, different buckets will be emptied onto the particular transverse discharge conveyor that needs more cookies or crackers in order to keep that packaging line in operation. In a like manner if a packaging line is down for some reason, no further cookies or crackers will be emptied onto that particular transverse discharge conveyor. If all of the transverse discharge conveyors that lead to packaging lines contain sufficient product the bucket conveyor will continue to operate with each bucket going past the feeding station a second time and being filled to preferably about 60 to 90 percent of its volume, and most preferably about 80 percent of its volume. If after the buckets are filled to about 60 to 90 percent of their volumes the contents are still not discharged onto a transverse conveyor, about half or more of the cookies or crackers in each bucket will then be layed and spread onto the storage station conveyor 16 for eventual working back into the system. Either the technique of tilting each bucket during each cycle so that it will empty its contents in excess of about 50 percent of its volume can be used, or in the alternative, there can be a sensor whereby only those buckets which contain product in excess of about 45 percent of their volume, and preferably about 40 percent, are tilted to remove sufficient product so that a second charge of product can be received without reaching a point of overflow. In this way the ovens and other operations do not have to be stopped to correct a packaging line problem. In addition the handling of product is reduced.

The bucket conveyor system can also contain a purge conveyor. One of transverse conveyors 17,18,19 or 20 can be used as a purge conveyor or another transverse conveyor can be added. The function of the purge conveyor is to receive all product when the baking line is being halted or switched to another product. In such a case the purge conveyor will receive all of the product for a period of time until the system is purged of a particular product.

There are yet other advantages to this bucket conveyor apparatus. However, a prime advantage is the degree of versatility in operation. Computerized control can be utilized with this bucket conveyor system. In addition the bucket conveyor system acts as a buffer for the other units in the full production sequence since it can store product. That is, when there is a short term problem upstream or downstream from the bucket conveyor system, the bucket conveyor system will permit the part that is not affected to continue to operate. If the problem is upstream, the bucket conveyor system can use product from the storage station and provide this product downstream. If the problem is downstream, the bucket conveyor system will put any excess product into the storage station and thus continue upstream operations as a result. Using this system, packaging lines that are being fed by the bucket conveyor mechanism can be utilized to their maximum. Further, due to the utilization of rearward tilting, the buckets lay and spread the product over a lower conveyor or table, with the result that there is very little damage or degradation to the product while it is being moved. This is a highly desirable attribute.

The buckets 11 are preferably made out of a material to which the transported product and any product coating (topping) will not adhere. The buckets can be made completely out of a non-adhering material, or made out of one material and have a non-adhering coating. In this regard, the buckets can be made out of polycarbonate plastics such as Lexan 194 which is available from the General Electric Company, polytetrafluoroethylene (Teflon) or the like, or coated with one of these materials. This reduces product coating buildup and equipment maintenance while also reducing product degradation.

In addition the vibratory conveyors that feed the product to the buckets and the transverse discharge conveyors also have a product contacting surface of the same or similar non-adhering material. This will likewise reduce product coating buildup on the surfaces of these units of equipment, thereby reducing maintenance, and will further decrease product degradation.

These bucket conveyor systems can be paired and work in tandem in a factory environment. In this way while a certain bucket conveyor system may be dedicated to a particular product line, the other bucket conveyor system can be dedicated to another product line. However, they can interchangeably use the same packaging lines. This provides for more versatility.

There are yet other adaptations that could be made to this present method and apparatus. However, these would contain the concepts contained herein.

We claim:

1. A method of conveying baked products having a topping thereon in a bucket conveyor system having a plurality of buckets, comprising:
providing substantially all of the product containing surfaces with a material to which the topping will not adhere;
moving each bucket from a point of receiving said baked products having a topping thereon to a point of discharging said baked products and back to said receiving point;
filling each bucket to a predetermined level of less than about 50 percent of its volume each cycle of the bucket conveyor system; and
discharging said baked products contained in each bucket by tilting each bucket rearwardly to lay and spread said baked products over a receiving area.

* * * * *

UNITED STATES PATENT AND TRADEMARK OFFICE
CERTIFICATE OF CORRECTION

PATENT NO. : 5,435,430
DATED : July 25, 1995
INVENTOR(S) : Stiener, et al

It is certified that error appears in the above-indentified patent and that said Letters Patent is hereby corrected as shown below:

On title page, item [75] Inventors: "Joseph Steiner, Somerset; Michael A. Carter, Flanders; Robert E. Strom, Kinnelon, all of N.J." should read --Joseph Stiener, Somerset; Michael A. Carter, Flanders; Robert E. Strom, Kinnelon, all of N.J.--

Signed and Sealed this

Third Day of October, 1995

Attest:

BRUCE LEHMAN

*Attesting Officer*  *Commissioner of Patents and Trademarks*